United States Patent
Salter et al.

(10) Patent No.: US 12,330,571 B2
(45) Date of Patent: Jun. 17, 2025

(54) ROCK RAIL ASSEMBLY

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Dennis Yee, Milford, MI (US); Aaron Peter Klop, Bloomfield Hills, MI (US); Satvinder Singh Matharu, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 18/060,345

(22) Filed: Nov. 30, 2022

(65) Prior Publication Data
US 2024/0174190 A1    May 30, 2024

(51) Int. Cl.
*B60R 19/42* (2006.01)
*B60R 3/00* (2006.01)
*B60R 3/02* (2006.01)
*B60R 19/18* (2006.01)
*B60R 19/38* (2006.01)

(52) U.S. Cl.
CPC .............. *B60R 19/42* (2013.01); *B60R 3/002* (2013.01); *B60R 3/02* (2013.01); *B60R 19/18* (2013.01); *B60R 19/38* (2013.01); *B60R 2019/1806* (2013.01)

(58) Field of Classification Search
CPC ......... B60R 19/42; B60R 19/18; B60R 19/38; B60R 19/24; B60R 3/002; B60R 3/02; B60R 3/00; B60R 2019/1806
See application file for complete search history.

(56) References Cited

U.S. PATENT DOCUMENTS

| | | | |
|---|---|---|---|
| 5,842,709 | A | 12/1998 | Maccabee |
| 5,915,830 | A | 6/1999 | Dickson et al. |
| 6,082,751 | A | 7/2000 | Hanes et al. |
| 6,129,401 | A | 10/2000 | Neag et al. |
| 6,270,099 | B1 | 8/2001 | Farkash |
| 6,325,397 | B1 | 12/2001 | Pascoe et al. |
| 6,375,207 | B1 | 4/2002 | Dean et al. |
| 6,382,650 | B1 | 5/2002 | Farkash |
| 6,406,045 | B1 | 6/2002 | Farkash |
| 6,641,158 | B2 | 11/2003 | Leitner |
| 6,830,257 | B2 | 12/2004 | Leitner |
| 6,834,875 | B2 | 12/2004 | Leitner et al. |
| 6,926,295 | B2 | 8/2005 | Berkebile et al. |

(Continued)

FOREIGN PATENT DOCUMENTS

CA    2806865 A1 *   8/2014   .............. B60R 3/02

*Primary Examiner* — John D Walters
(74) *Attorney, Agent, or Firm* — Vichit Chea; Price Heneveld LLP

(57) ABSTRACT

A rock rail assembly for a vehicle includes a mounting assembly coupled to the vehicle and comprising a shock absorption pad, and a rail assembly pivotably coupled to the mounting assembly and having a rail. The shock absorption pad is the vehicle-laterally-outboardmost portion of the mounting assembly. The rail assembly is operable to pivot relative to the mounting assembly to move the rail between a stowed position and a deployed position. In the stowed position of the rail, a portion of the rail abuts the shock absorption pad.

20 Claims, 8 Drawing Sheets

(56) References Cited

U.S. PATENT DOCUMENTS

| | | |
|---|---|---|
| 6,938,909 B2 | 9/2005 | Leitner |
| 6,942,233 B2 | 9/2005 | Leitner et al. |
| 6,955,370 B2 | 10/2005 | Fabiano et al. |
| 7,007,961 B2 | 3/2006 | Leitner et al. |
| 7,017,927 B2 | 3/2006 | Henderson et al. |
| 7,055,839 B2 | 6/2006 | Leitner |
| 7,118,120 B2 | 10/2006 | Lee et al. |
| 7,163,221 B2 | 1/2007 | Leitner |
| 7,287,771 B2 | 10/2007 | Lee et al. |
| 7,367,574 B2 | 5/2008 | Leitner |
| 7,377,531 B2 | 5/2008 | Fabiano et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,441,790 B2 | 10/2008 | Lechkun |
| 7,469,916 B2 | 12/2008 | Watson |
| 7,487,986 B2 | 2/2009 | Leitner et al. |
| 7,513,565 B2 | 4/2009 | Watson |
| 7,566,064 B2 | 7/2009 | Leitner et al. |
| 7,584,975 B2 | 9/2009 | Leitner |
| 7,594,672 B2 | 9/2009 | Piotrowski |
| 7,607,674 B2 | 10/2009 | Watson |
| 7,621,546 B2 | 11/2009 | Ross et al. |
| 7,637,519 B2 | 12/2009 | Leitner et al. |
| 7,677,584 B2 | 3/2010 | Raley et al. |
| 7,712,755 B2 | 5/2010 | Yang et al. |
| D618,148 S | 6/2010 | Hoppert |
| 7,740,261 B2 | 6/2010 | Leitner et al. |
| 7,775,536 B2 | 8/2010 | Shumway |
| 7,841,609 B2 | 11/2010 | Okada et al. |
| 7,857,337 B2 | 12/2010 | Ferguson et al. |
| 7,878,519 B2 | 2/2011 | Hallmark |
| 7,900,944 B2 | 3/2011 | Watson |
| 7,934,737 B2 | 5/2011 | Okada et al. |
| 7,976,042 B2 | 7/2011 | Watson et al. |
| 8,042,821 B2 | 10/2011 | Yang et al. |
| 8,047,141 B2 | 11/2011 | Bramauer |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,196,865 B2 | 6/2012 | Martin |
| 8,205,901 B2 | 6/2012 | Yang et al. |
| 8,251,178 B2 | 8/2012 | Krobot |
| 8,308,177 B2 | 11/2012 | Fravel et al. |
| 8,342,550 B2 | 1/2013 | Stickles et al. |
| 8,342,551 B2 | 1/2013 | Watson |
| 8,360,455 B2 | 1/2013 | Leitner et al. |
| 8,366,129 B2 | 2/2013 | Salmon et al. |
| 8,382,132 B2 | 2/2013 | Kowalski |
| 8,408,571 B2 | 4/2013 | Leitner et al. |
| 8,419,034 B2 | 4/2013 | Leitner et al. |
| 8,469,380 B2 | 6/2013 | Yang et al. |
| 8,556,283 B2 | 10/2013 | Coochesfahani |
| 8,596,507 B2 | 12/2013 | Lee et al. |
| 8,602,467 B2 | 12/2013 | Lee et al. |
| 8,678,461 B2 | 3/2014 | Cha et al. |
| 8,714,575 B2 | 5/2014 | Watson |
| 8,720,925 B1 | 5/2014 | Oh et al. |
| 8,789,865 B2 | 7/2014 | Cha et al. |
| 8,827,294 B1 | 9/2014 | Leitner et al. |
| 8,833,781 B2 | 9/2014 | Hayes |
| 8,833,782 B2 | 9/2014 | Huotari et al. |
| 8,844,779 B2 | 9/2014 | Cha et al. |
| 8,844,957 B2 | 9/2014 | Leitner et al. |
| 8,870,208 B2 | 10/2014 | Cha et al. |
| D718,195 S | 11/2014 | Hayes |
| 8,924,090 B2 | 12/2014 | Cha et al. |
| 8,936,266 B2 | 1/2015 | Leitner et al. |
| 8,939,456 B2 | 1/2015 | Shelswell et al. |
| 8,944,451 B2 | 2/2015 | Leitner et al. |
| 8,985,606 B2 | 3/2015 | Fichter |
| 9,010,473 B1 | 4/2015 | Rasmussen et al. |
| 9,056,583 B2 | 6/2015 | Cha et al. |
| 9,174,580 B2 | 11/2015 | Cha |
| 9,174,581 B2 | 11/2015 | Cha et al. |
| 9,187,041 B2 | 11/2015 | Cha et al. |
| 9,266,475 B2 | 2/2016 | Cha et al. |
| D751,953 S | 3/2016 | Hayes et al. |
| 9,272,667 B2 | 3/2016 | Smith |
| 9,302,626 B2 | 4/2016 | Leitner et al. |
| 9,308,870 B2 | 4/2016 | Yang et al. |
| 9,346,405 B2 | 5/2016 | Leitner et al. |
| 9,452,713 B2 | 9/2016 | Stickles |
| 9,481,396 B2 | 11/2016 | Jachowski et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,616,940 B2 | 4/2017 | Ito et al. |
| 9,637,057 B2 | 5/2017 | Lee |
| 9,649,983 B2 | 5/2017 | Watson |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,758,104 B2 | 9/2017 | Fichter |
| 9,764,691 B2 | 9/2017 | Stickles et al. |
| 9,771,024 B2 | 9/2017 | Hayes et al. |
| 9,776,571 B2 | 10/2017 | Fortin et al. |
| 9,834,147 B2 | 12/2017 | Smith |
| 9,896,033 B2 | 2/2018 | Chen et al. |
| 9,902,327 B1 | 2/2018 | Singh et al. |
| 9,944,231 B2 | 4/2018 | Leitner et al. |
| 9,975,490 B1 | 5/2018 | Ozog et al. |
| 10,040,396 B2 | 8/2018 | Stickles et al. |
| 10,046,729 B2 | 8/2018 | Perez Garcia et al. |
| 10,053,017 B2 | 8/2018 | Leitner et al. |
| 10,059,268 B2 | 8/2018 | Hayes et al. |
| 10,071,752 B2 | 9/2018 | Aigner et al. |
| 10,077,002 B2 | 9/2018 | Okuyama |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,088 B2 | 10/2018 | Smith |
| 10,118,557 B2 | 11/2018 | Pribisic |
| 10,124,735 B2 | 11/2018 | Du et al. |
| 10,183,624 B2 | 1/2019 | Leitner et al. |
| 10,195,997 B2 | 2/2019 | Smith |
| D844,522 S | 4/2019 | Bundy et al. |
| D846,470 S | 4/2019 | Bundy et al. |
| 10,272,842 B2 | 4/2019 | Du et al. |
| 10,322,677 B1 | 6/2019 | Leitner et al. |
| 10,336,260 B1 | 7/2019 | Salter et al. |
| 10,343,610 B2 | 7/2019 | Long et al. |
| 10,377,300 B2 | 8/2019 | Salter et al. |
| 10,377,313 B1 | 8/2019 | Brunner et al. |
| 10,384,614 B1 | 8/2019 | Du et al. |
| 10,399,500 B2 | 9/2019 | Hayes |
| 10,427,607 B2 | 10/2019 | Otacioglu et al. |
| 10,449,905 B2 | 10/2019 | Stickles et al. |
| 10,479,278 B2 | 11/2019 | Du et al. |
| 10,486,602 B1 | 11/2019 | Bundy et al. |
| 10,493,920 B2 | 12/2019 | Leitner et al. |
| 10,513,224 B2 | 12/2019 | Smith |
| 10,518,727 B1 | 12/2019 | Barbuta et al. |
| 10,538,204 B2 | 1/2020 | Long et al. |
| 10,576,879 B1 | 3/2020 | Salter et al. |
| 10,596,971 B2 | 3/2020 | Leitner et al. |
| 10,618,472 B2 | 4/2020 | Du et al. |
| D883,167 S | 5/2020 | McMath |
| 10,649,483 B2 | 5/2020 | Liu et al. |
| 10,654,418 B2 | 5/2020 | He et al. |
| 10,676,031 B2 | 6/2020 | Leitner et al. |
| 10,676,033 B1 | 6/2020 | Carr et al. |
| 10,682,960 B2 | 6/2020 | Du et al. |
| 10,696,233 B2 | 6/2020 | Stickles et al. |
| 10,723,271 B2 | 7/2020 | Aitharaju et al. |

(56) References Cited

U.S. PATENT DOCUMENTS

| | | |
|---|---|---|
| 10,759,349 B2 | 9/2020 | Leitner |
| 10,773,649 B2 | 9/2020 | Ye |
| 10,773,670 B2 | 9/2020 | Smith et al. |
| 10,821,904 B2 | 11/2020 | Du et al. |
| 10,913,397 B2 | 2/2021 | Pribisic |
| 10,919,453 B2 | 2/2021 | Watson |
| 10,919,454 B2 | 2/2021 | Stickles et al. |
| 10,953,818 B2 | 3/2021 | Graham et al. |
| 10,967,801 B2 | 4/2021 | Kaddouh et al. |
| 10,981,512 B2 | 4/2021 | Crandall |
| 11,021,108 B2 | 6/2021 | Du et al. |
| 11,036,210 B2 | 6/2021 | Crandall |
| 11,046,252 B1 | 6/2021 | Bundy et al. |
| 11,077,802 B2 | 8/2021 | Long et al. |
| 11,135,978 B2 | 10/2021 | Kaddouh |
| 11,173,845 B2 | 11/2021 | Leitner et al. |
| 11,198,394 B2 * | 12/2021 | Du ............... B60R 3/02 |
| 2019/0126873 A1 | 5/2019 | Baker |
| 2019/0193639 A1 | 6/2019 | Smith |
| 2020/0023780 A1 | 1/2020 | Du et al. |
| 2020/0062183 A1 | 2/2020 | Smith et al. |
| 2020/0062184 A1 | 2/2020 | Miller et al. |
| 2020/0114937 A1 | 4/2020 | Mair et al. |
| 2020/0180512 A1 | 6/2020 | Godfrey |
| 2020/0189473 A1 | 6/2020 | Norris |
| 2020/0269763 A1 | 8/2020 | Du et al. |
| 2020/0282913 A1 | 9/2020 | Qing et al. |
| 2020/0282914 A1 | 9/2020 | Du et al. |
| 2020/0317133 A1 | 10/2020 | Leitner |
| 2020/0331396 A1 | 10/2020 | Du et al. |
| 2020/0339039 A1 | 10/2020 | Watson |
| 2020/0339204 A1 | 10/2020 | Crandall |
| 2020/0361389 A1 | 11/2020 | Leitner et al. |
| 2020/0369209 A1 | 11/2020 | Pantea et al. |
| 2020/0398760 A1 | 12/2020 | Yake |
| 2021/0053520 A1 | 2/2021 | Smith et al. |
| 2021/0070224 A1 | 3/2021 | Oji et al. |
| 2021/0070225 A1 | 3/2021 | Oji et al. |
| 2021/0070226 A1 | 3/2021 | Oji et al. |
| 2021/0070227 A1 | 3/2021 | Oji et al. |
| 2021/0070228 A1 | 3/2021 | Oji et al. |
| 2021/0078591 A1 | 3/2021 | Du et al. |
| 2021/0122278 A1 | 4/2021 | Hsu |
| 2021/0129759 A1 | 5/2021 | Watson |
| 2021/0129760 A1 | 5/2021 | Stickles et al. |
| 2021/0188178 A1 | 6/2021 | Tok et al. |
| 2021/0213884 A1 | 7/2021 | Dellock et al. |
| 2021/0213885 A1 | 7/2021 | Du et al. |
| 2021/0221449 A1 | 7/2021 | Milani et al. |
| 2021/0253029 A1 | 8/2021 | Berger et al. |
| 2021/0284071 A1 | 9/2021 | Smith |
| 2021/0300250 A1 | 9/2021 | Smith |
| 2021/0302947 A1 | 9/2021 | Crandall |
| 2021/0309154 A1 | 10/2021 | McKinnis |
| 2021/0323480 A1 | 10/2021 | Long et al. |
| 2021/0331715 A1 | 10/2021 | Theis et al. |
| 2021/0347303 A1 | 11/2021 | Qing et al. |
| 2021/0347304 A1 | 11/2021 | Qing et al. |
| 2023/0234511 A1 * | 7/2023 | Du ............... B60R 3/02 280/166 |

* cited by examiner

ROCK RAIL ASSEMBLY

FIELD OF THE DISCLOSURE

The present disclosure generally relates to a rock rail assembly for a vehicle. More specifically, the present disclosure relates to a rock rail assembly for a vehicle that is operable between a stowed position and a deployed position.

BACKGROUND OF THE DISCLOSURE

Vehicles can include running boards or protective rock rails.

SUMMARY OF THE DISCLOSURE

According to a first aspect of the present disclosure, a rock rail assembly for a vehicle includes a mounting assembly coupled to the vehicle and comprising a shock absorption pad, and a rail assembly pivotably coupled to the mounting assembly and having a rail. The shock absorption pad is the vehicle-laterally-outboardmost portion of the mounting assembly. The rail assembly is operable to pivot relative to the mounting assembly to move the rail between a stowed position and a deployed position. In the stowed position of the rail, a portion of the rail abuts the shock absorption pad.

Embodiments of the first aspect of the disclosure can include any one or a combination of the following features:
- the mounting assembly includes a mounting structure that is mounted to an underside of the vehicle, wherein the mounting structure includes an attachment surface, the shock absorption pad abuts the attachment surface, and a vehicle-lateral direction is substantially normal to the attachment surface;
- the mounting structure is a metal mounting structure, and the shock absorption pad is a non-metal shock absorption pad;
- the shock absorption pad includes a contact surface that abuts the rail in the stowed position, and wherein a vehicle-lateral direction is substantially normal to the contact surface;
- the position of the rail in the deployed position is vehicle-downward of the position of the rail in the stowed position; and
- the rail assembly includes a pivot bar that is pivotably coupled with the mounting assembly, and a rail bracket that fixedly couples the rail and the pivot bar.

According to a second aspect of the present disclosure, a rock rail assembly for a vehicle includes a first mounting assembly coupled to the vehicle and having a first shock absorption pad, a second mounting assembly coupled to the vehicle in a spaced relationship with the first mounting assembly and having a second shock absorption pad, a third mounting assembly coupled to the vehicle in a spaced relationship with and positioned between the first and second mounting assemblies, a first linkage operably coupled to the first mounting assembly, a second linkage operably coupled to the second mounting assembly, and a rail coupled to and extending between the first and second linkages. The third mounting assembly includes a third shock absorption pad. Further, the first and second linkages are operable to move relative to the first and second mounting assemblies, respectively, such that the rail is operable between a stowed position and a deployed position. In the stowed position, the rail abuts the first, second, and third shock absorption pads. In the deployed position, the rail is in a spaced relationship with each of the first, second, and third shock absorption pads.

Embodiments of the second aspect of the disclosure can include any one or a combination of the following features:
- the first linkage includes a pivot bar pivotably coupled with the first mounting assembly, and a rail bracket that fixedly couples the rail and the pivot bar;
- the first mounting assembly includes a first mounting structure that the first shock absorption pad is coupled to, the second mounting assembly includes a second mounting structure that the second shock absorption pad is coupled to, and the third mounting assembly includes a third mounting structure that the third shock absorption pad is coupled to, wherein each of the first, second, and third mounting structures are mounted to an underside of the vehicle, and the third mounting structure is smaller than the first mounting structure and the second mounting structure;
- the first mounting assembly includes a first mounting structure that is mounted to an underside of the vehicle, wherein the first mounting structure includes an attachment surface, the first shock absorption pad abuts the attachment surface, and a vehicle-lateral direction is substantially normal to the attachment surface;
- the first mounting structure is a metal mounting structure, and the first shock absorption pad is a non-metal shock absorption pad;
- the first shock absorption pad includes a contact surface that abuts the rail in the stowed position, and wherein a vehicle-lateral direction is substantially normal to the contact surface;
- the first shock absorption pad is the vehicle-laterally-outboardmost portion of the first mounting assembly; and
- the position of the rail in the deployed position is vehicle-downward of the position of the rail in the stowed position.

According to a third aspect of the present disclosure, a rock rail assembly for a vehicle includes a rail coupled to the vehicle and operable to move relative to the vehicle between a stowed position and a deployed position, and a first shock absorption pad having a contact surface that abuts the rail in the stowed position. A vehicle-lateral direction is substantially normal to the contact surface.

Embodiments of the third aspect of the disclosure can include any one or a combination of the following features:
- a second shock absorption pad in a spaced relationship with the first shock absorption pad, wherein the second shock absorption pad has a contact surface that abuts the rail in the stowed position of the rail;
- a third shock absorption pad in a spaced relationship with the first and second shock absorption pads, wherein the third shock absorption pad has a contact surface that abuts the rail in the stowed position of the rail;
- the position of the rail in the deployed position is vehicle-downward of the position of the rail in the stowed position;
- a linkage coupled to the rail and pivotably coupled to a mounting assembly mounted to the vehicle, wherein the rail moves between the stowed and deployed positions via pivotal movement of the linkage relative to the mounting assembly; and
- the mounting assembly includes the first shock absorption pad, and the first shock absorption pad is the vehicle-laterally-outboardmost portion of the mounting assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
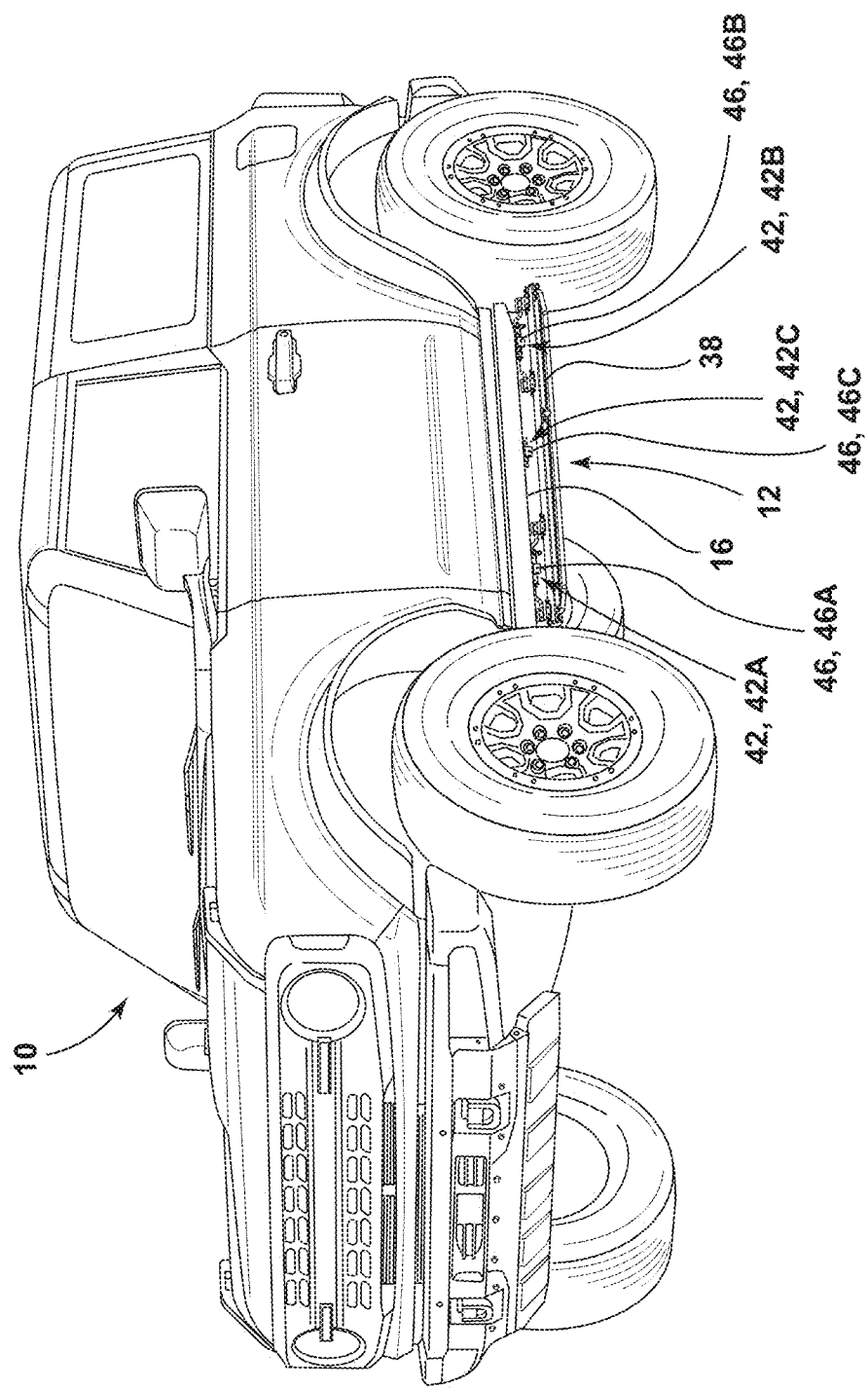
FIG. 1 is a side perspective view of a vehicle that includes a rock rail assembly, according to one embodiment.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-8, a vehicle 10 includes a rock rail assembly 12. The rock rail assembly 12 includes a mounting structure 14 that is configured to be mounted to an underside 16 of the vehicle 10. An arm 18 is mounted to the mounting structure 14 and defines a receiving hollow 20. A motor bracket 22 is coupled to the mounting structure 14. A motor 24 is mounted to the motor bracket 22 and includes a shaft 26. The shaft 26 has a first end 28 that is engaged with a rotor 30 of the motor 24, and a second end 32 that is distal from the first end 28. The second end 32 of the shaft 26 is received within the receiving hollow 20 defined by the arm 18. The shaft 26 includes a worm gear portion 34 that is disposed between the first and second ends 28, 32 of the shaft 26. Operation of the motor 24 drives rotation of the shaft 26. A pivot bar 36 is pivotably coupled with the mounting structure 14. A rail 38 is coupled with the pivot bar 36 and is operable to move between a stowed position and a deployed position via pivotal movement of the pivot bar 36 relative to the mounting structure 14. A sector gear 40 is coupled to the pivot bar 36 and is operably engaged with the worm gear portion 34 of the shaft 26. Rotation of the shaft 26 by the motor 24 drives pivotal movement of the pivot bar 36 relative to the mounting structure 14, due to engagement between the worm gear portion 34 of the shaft 26 and the sector gear 40, causing movement of the rail 38 coupled thereto between the stowed position and the deployed position. In the stowed position of the rail 38, the sector gear 40 abuts the motor bracket 22. In the deployed position of the rail 38, the sector gear 40 abuts the arm 18.

Figure 2:
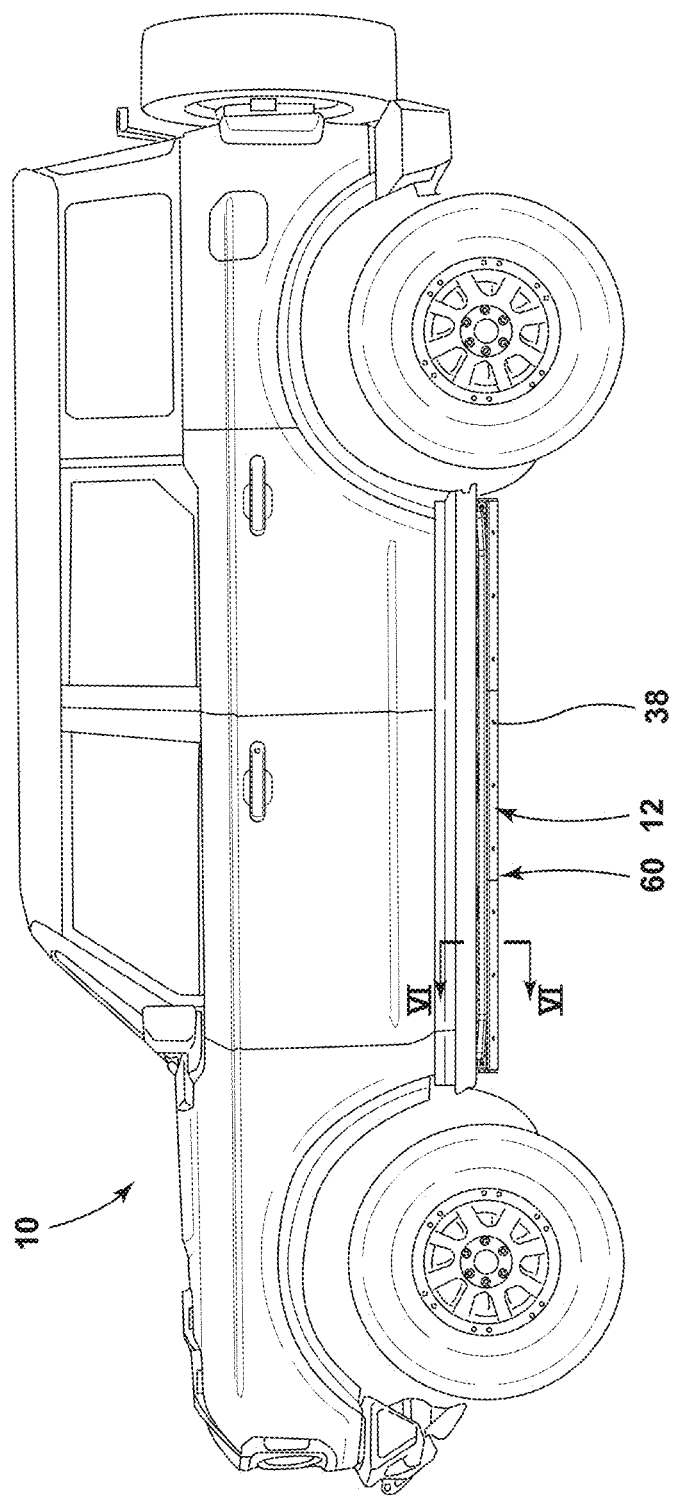
FIG. 2 is a side elevational view of a vehicle, illustrating a rock rail assembly of the vehicle in a stowed position, according to one embodiment.
Figure 3:
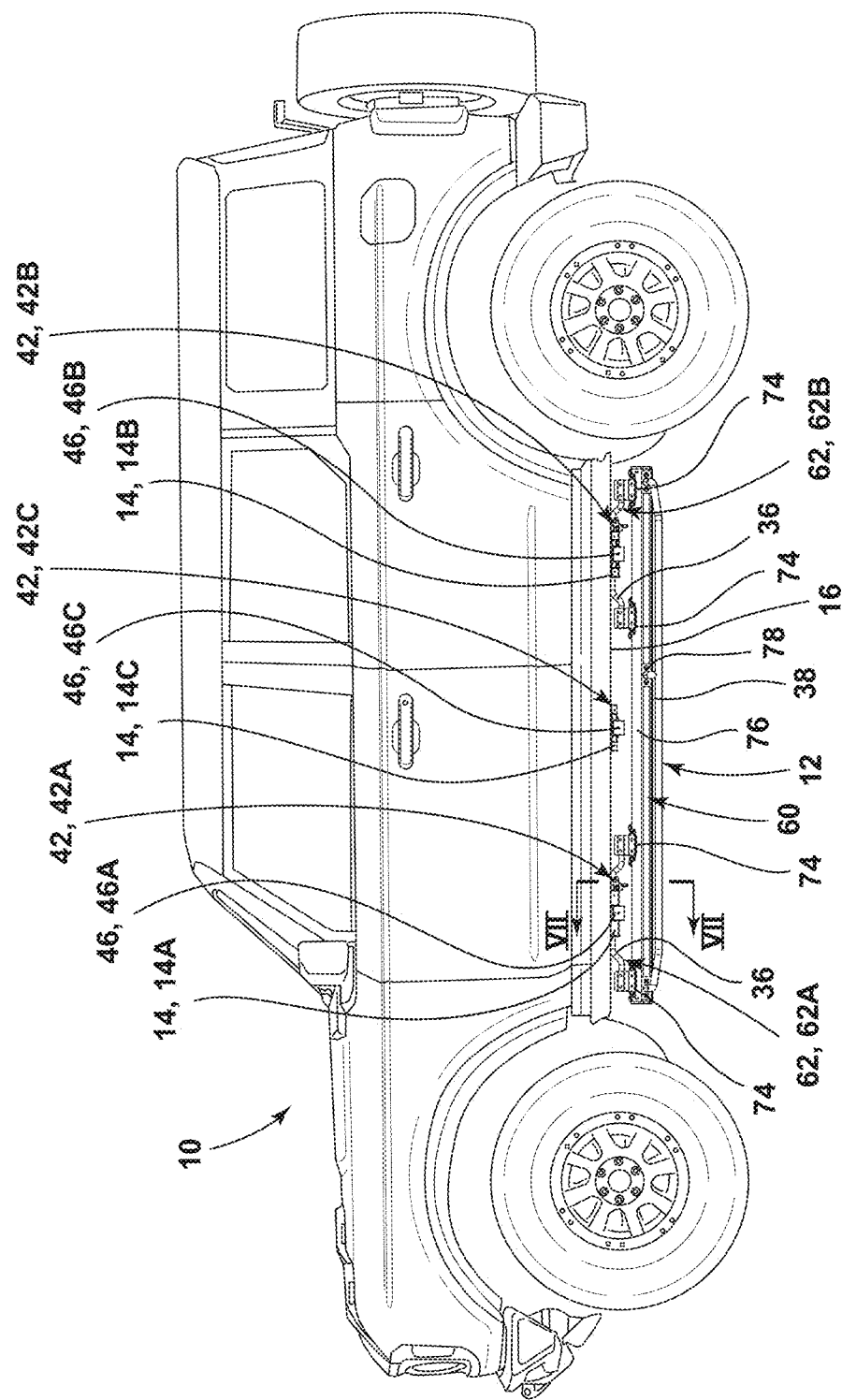
FIG. 3 is a side elevational view of a vehicle, illustrating the rock rail assembly in a deployed position, according to one embodiment.
Figure 4:
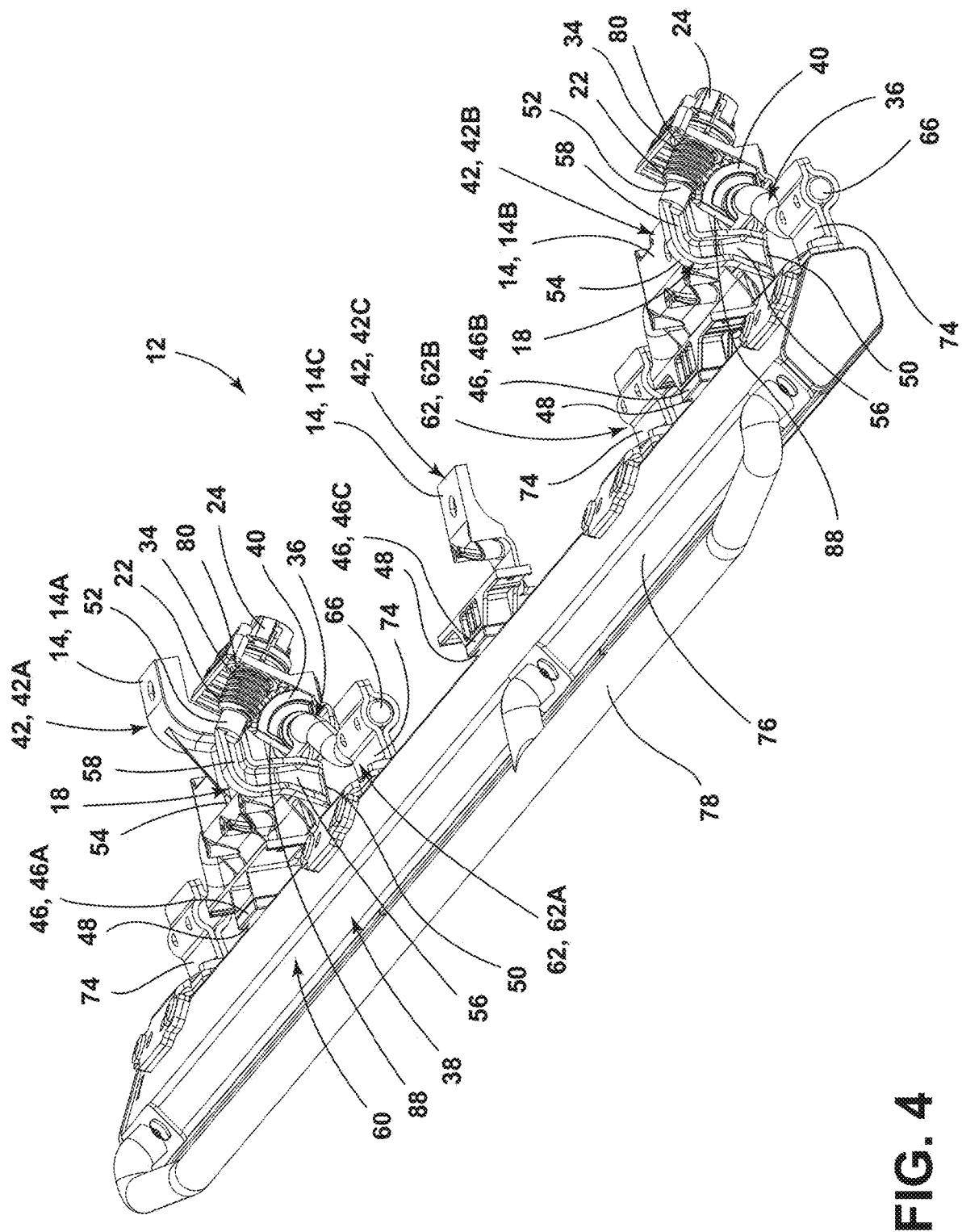
FIG. 4 is a top perspective view of a rock rail assembly, illustrating a rail of the rock rail assembly in the stowed position, according to one embodiment.
Figure 5:
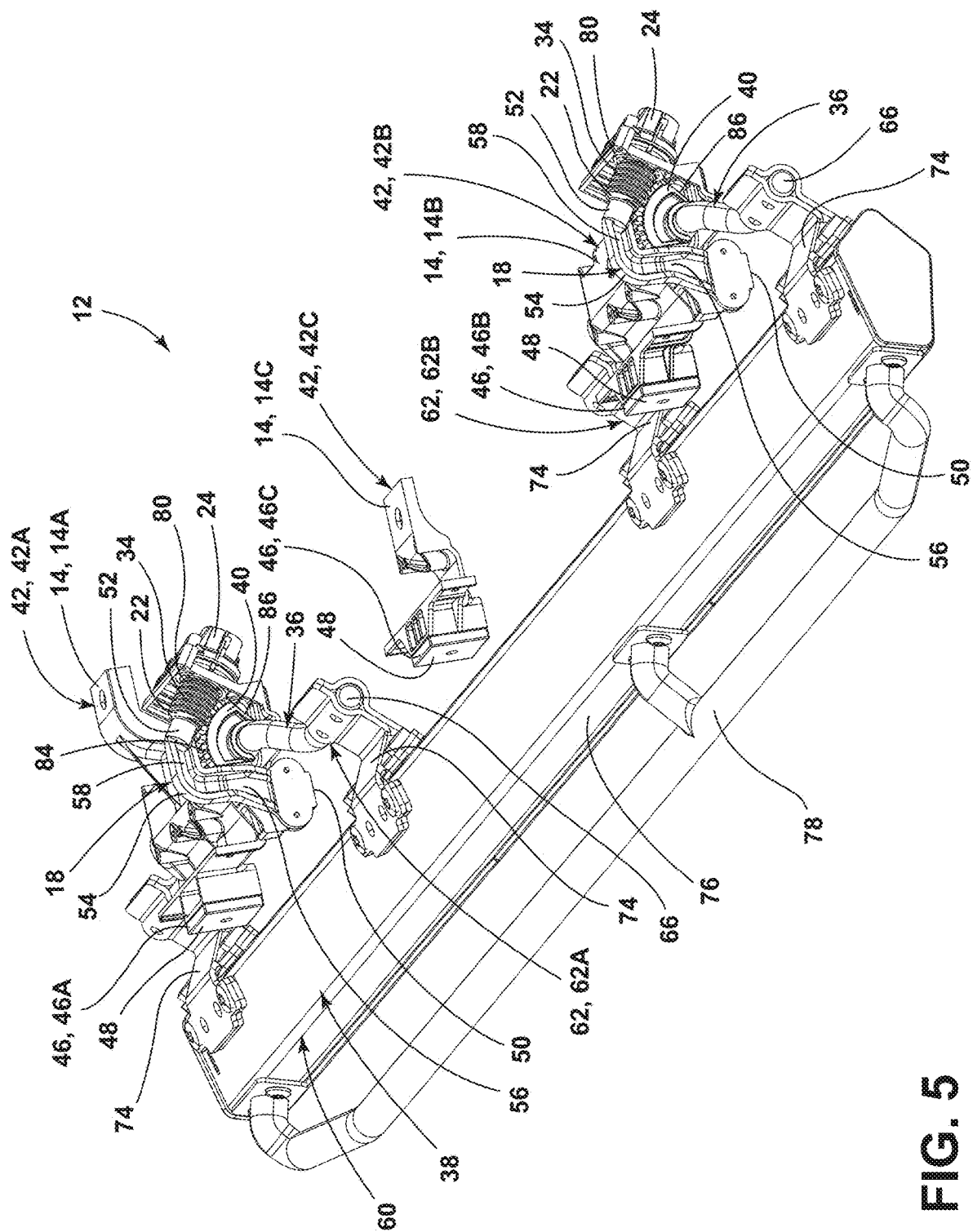
FIG. 5 is a top perspective view of the rock rail assembly, illustrating the rail of the rock rail assembly in a deployed position, according to one embodiment.

Referring now to FIGS. 1-5, the vehicle 10 includes the rock rail assembly 12. The rock rail assembly 12 includes the rail 38, as illustrated in FIGS. 1-5. The rail 38 of the rock rail assembly 12 is configured to protect the vehicle 10 from obstacles (e.g., rocks) that the vehicle 10 may encounter during operation of the vehicle 10. For example, the rail 38 may protect the vehicle 10 from obstacles while the vehicle 10 is operating in an off-road environment. The rail 38 of the rock rail assembly 12 may further be configured to provide a step for a user entering or exiting the vehicle 10. In other words, the rail 38 may serve as a running board. The rail 38 of the rock rail assembly 12 is operable between a stowed position, as illustrated in FIGS. 2 and 4, and a deployed position, as illustrated in FIGS. 3 and 5. In various implementations, the position of the rail 38 in the deployed position is vehicle-downward of the position of the rail 38 in the stowed position. In operation, the rail 38 may be configured to protect the vehicle 10 from obstacles in the stowed position of the rail 38, and the rail 38 may serve as a running board in the deployed position of the rail 38.

Figure 8:
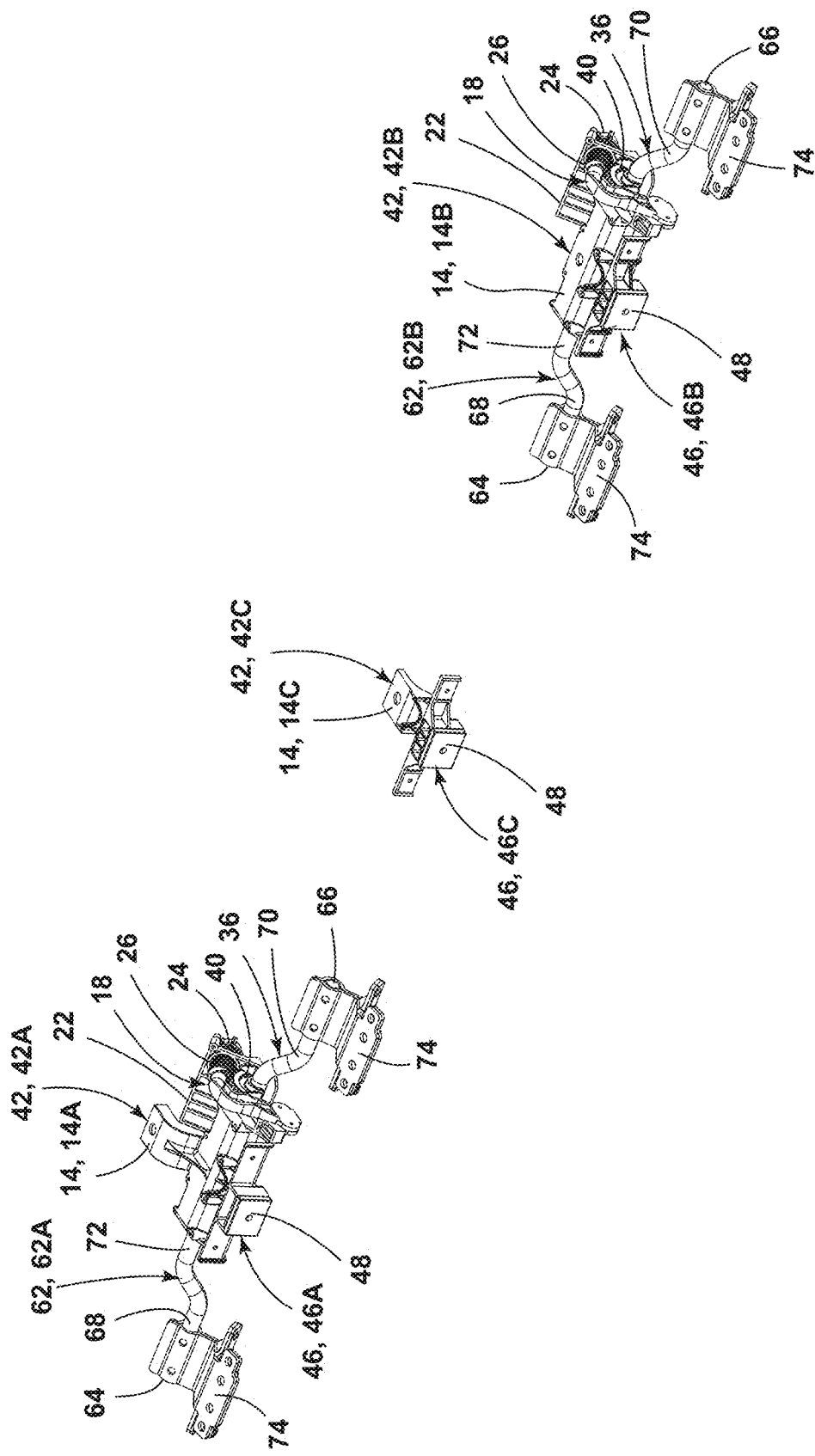
FIG. 8 is a top perspective view of first, second, and third mounting assemblies that respectively include first, second, and third shock absorption pads, and a first linkage pivotably coupled to the first mounting assembly, and a second linkage pivotally coupled to the second mounting assembly, according to one embodiment.

Referring now to FIGS. 2-5 and 8, the rock rail assembly 12 includes a mounting assembly 42 that is coupled to the vehicle 10. In various embodiments, the rock rail assembly 12 can include a plurality of mounting assemblies 42. For example, the rock rail assembly 12 can include a first mounting assembly 42A, a second mounting assembly 42B, and a third mounting assembly 42C, as illustrated in FIGS. 4, 5, and 8 and described further herein. The mounting assembly 42 of the rock rail assembly 12 includes the mounting structure 14. The mounting structure 14 is configured to be mounted to the underside 16 of the vehicle 10. In various implementations, the mounting structure 14 is a metal mounting structure 14. In other words, the mounting structure 14 is formed of metal, such as steel. The mounting structure 14 can include an attachment surface 44. The attachment surface 44 is configured to have a shock absorption pad 46 attached thereto, such that the shock absorption pad 46 abuts the attachment surface 44 of the mounting structure 14, as described further herein.

Figure 6:
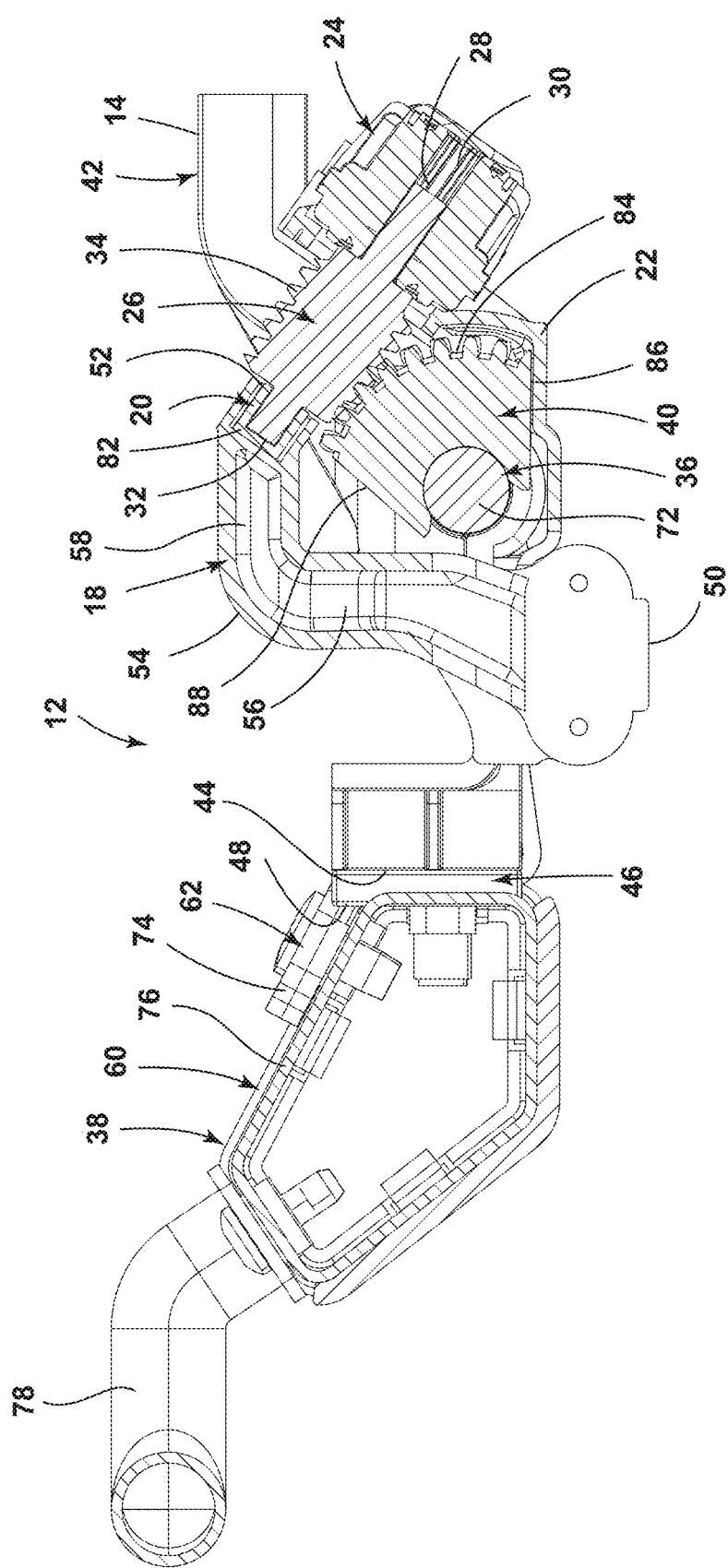
FIG. 6 is a cross-sectional view of the rock rail assembly of FIG. 2 taken at line VI-VI, illustrating the rail in the stowed position, such that the rail abuts a shock absorption pad of a mounting assembly, according to one embodiment.
Figure 7:
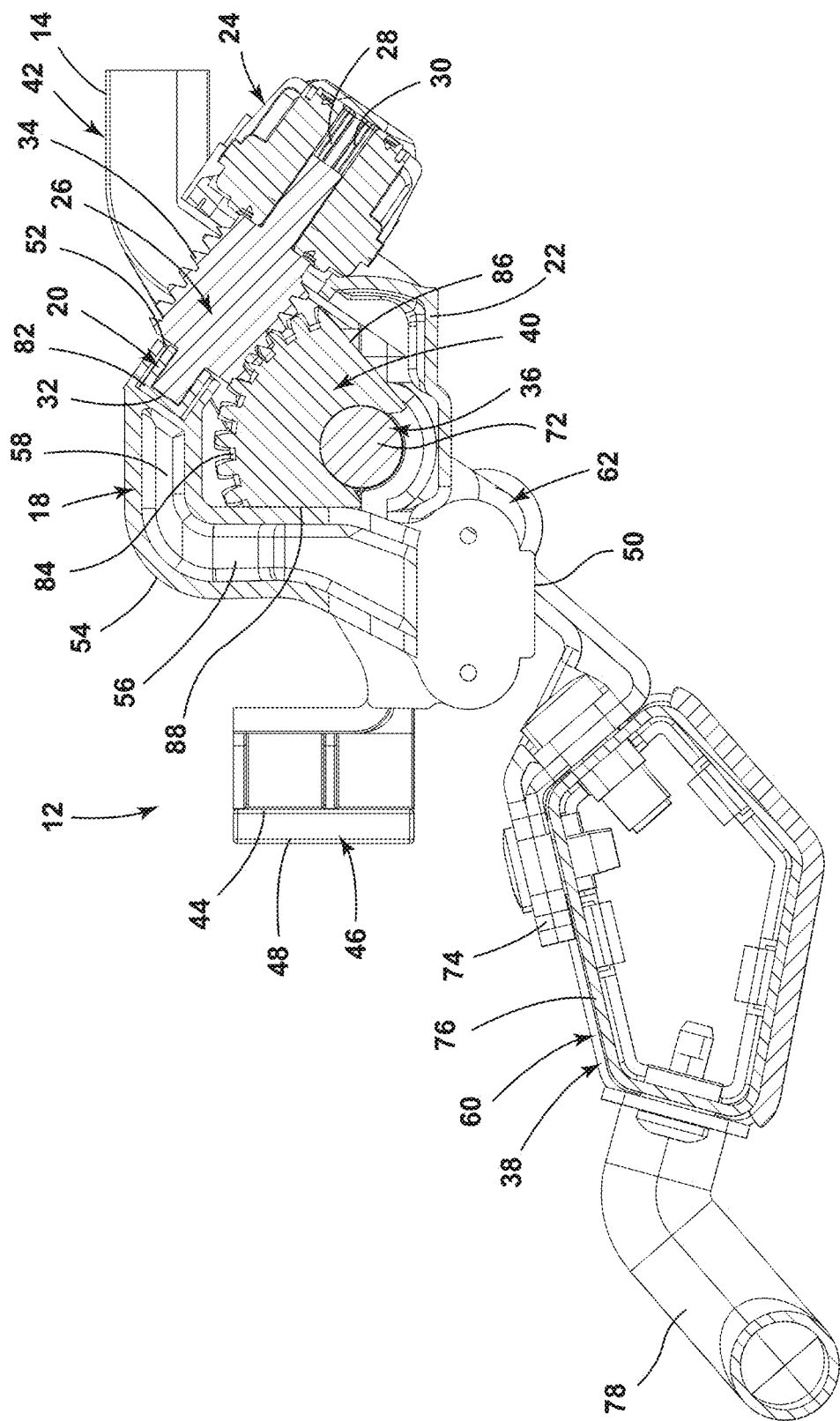
FIG. 7 is a cross-sectional view of the rock rail assembly of FIG. 3 taken at line VII-VII, illustrating the rail in the deployed position, such that the rail is in a spaced relationship with the shock absorption pad of the mounting assembly, according to one embodiment.

As illustrated in FIGS. 6 and 7, the attachment surface 44 of the mounting structure 14 can be oriented such that a vehicle-lateral direction is substantially normal to the attachment surface 44. As such, the attachment surface 44 of the mounting structure 14 faces vehicle-laterally-outboard, in various embodiments. In some embodiments, the attachment surface 44 of the mounting structure 14 is the vehicle-laterally-outboardmost portion of the mounting structure 14 of the mounting assembly 42.

Referring now to FIGS. 3-7, the mounting assembly 42 includes the shock absorption pad 46. The rail 38 of the rock rail assembly 12 is configured to abut the shock absorption pad 46 in the stowed position of the rail 38, as illustrated in FIGS. 4 and 6 and described further herein. The shock absorption pad 46 is configured to cushion the rail 38 and/or protect the rock rail assembly 12 of the vehicle 10 in the event that an external force is applied to the rail 38, such as a laterally-inboard force from a rock while the vehicle 10 is operating in an off-road environment, while the rail 38 is in the stowed position.

In various embodiments, the shock absorption pad 46 is attached to the mounting structure 14 of the mounting assembly 42. For example, as illustrated in FIGS. 4-8, the shock absorption pad 46 of the mounting assembly 42 is coupled to the mounting structure 14, such that the shock absorption pad 46 abuts the attachment surface 44 of the mounting structure 14. As illustrated in FIGS. 4 and 6, the shock absorption pad 46 includes a contact surface 48. The contact surface 48 abuts the rail 38 in the stowed position of the rail 38. In various implementations, the vehicle-lateral direction is substantially normal to the contact surface 48 of the shock absorption pad 46, as illustrated in FIG. 7. In various embodiments, the contact surface 48 of the shock absorption pad 46 is opposite the surface of the shock absorption pad 46 that abuts the attachment surface 44 of the mounting structure 14.

In some embodiments, the shock absorption pad 46 is the vehicle-laterally-outboardmost portion of the mounting assembly 42. For example, in the embodiment illustrated in FIG. 7, the contact surface 48 of the shock absorption pad 46 is the vehicle-laterally-outboardmost portion of the mounting assembly 42. In some implementations, the shock absorption pad 46 is a non-metal shock absorption pad 46. In other words, the shock absorption pad 46 is formed of a material that is not metal. In an exemplary embodiment of the mounting assembly 42, the mounting structure 14 is a metal mounting structure 14 and the shock absorption pad 46 is a non-metal shock absorption pad 46. It is contemplated that the non-metal shock absorption pad 46 can be formed of a variety of non-metal materials (e.g., rubber, plastic, resin, etc.).

Referring now to FIGS. 3-8, the mounting assembly 42 of the rock rail assembly 12 can include the arm 18. The arm 18 is mounted to the mounting structure 14 and defines the receiving hollow 20. In the embodiment illustrated in FIGS. 4-7, the arm 18 of the mounting assembly 42 is an L-shaped arm 18 that includes a proximal end 50 that is coupled to the mounting structure 14, a distal end 52 that is distal from the mounting structure 14, and a corner 54 that is disposed between the proximal end 50 and the distal end 52 of the arm 18. In the illustrated embodiment, the arm 18 includes a proximal portion 56 that extends from the proximal end 50 of the arm 18 to the corner 54 of the arm 18 and a distal portion 58 that extends from the corner 54 of the arm 18 to the distal end 52 of the arm 18. In various implementations, the distal portion 58 defines the receiving hollow 20 of the arm 18, as illustrated in FIGS. 6 and 7.

Referring still to FIGS. 3-7, in some implementations, the proximal end 50 of the arm 18 is a first distance from the corner 54 of the arm 18, and the distal end 52 of the arm 18 is a second distance from the corner 54 of the arm 18, wherein the first distance is greater than the second distance. In other words, a length of the proximal portion 56 is greater than a length of the distal portion 58 of the arm 18, in various embodiments.

Referring still to FIGS. 3-7, the mounting assembly 42 of the vehicle 10 includes the motor bracket 22. The motor bracket 22 is coupled to the mounting structure 14. In the embodiment illustrated in FIGS. 4 and 5, the motor bracket 22 is positioned vehicle-laterally-inboard of the arm 18 of the mounting assembly 42. In some implementations, the motor 24 of the rock rail assembly 12 is configured to be mounted on the vehicle-laterally-inboard side of the motor bracket 22, and a shaft 26 of the motor 24 is configured to extend through an aperture 80 defined by the motor bracket 22 toward the arm 18 of the mounting assembly 42, as described further herein.

In various implementations, the mounting assembly 42 can include more or fewer components. For example, in the embodiment illustrated in FIGS. 4 and 5, the rock rail assembly 12 includes a first mounting assembly 42A, a second mounting assembly 42B, and a third mounting assembly 42C. The first mounting assembly 42A, which, as illustrated, is the vehicle-forwardmost mounting assembly 42, includes a first mounting structure 14A and a first shock absorption pad 46A coupled with the first mounting structure 14A. The first mounting assembly 42A further includes at least the arm 18 coupled to the first mounting structure 14A and the motor bracket 22 coupled to the first mounting structure 14A.

The second mounting assembly 42B, which, as illustrated, is the vehicle-rearwardmost mounting assembly 42 and is in a spaced relationship with the first mounting assembly 42A, includes a second mounting structure 14B and a second shock absorption pad 46B coupled with the second mounting structure 14B. The second mounting assembly 42B further includes at least the arm 18 coupled to the second mounting structure 14B and the motor bracket 22 coupled to the second mounting structure 14B.

The third mounting assembly 42C, which is in a spaced relationship with and positioned between the first and second mounting assemblies 42A and 42B, includes a third mounting structure 14C and a third shock absorption pad 46C coupled to the third mounting structure 14C. However, in the embodiment illustrated in FIG. 8, the third mounting structure 14C does not include the arm 18 and the motor bracket 22. Further, as illustrated in FIG. 8, the third mounting structure 14C is smaller than the first mounting structure 14A and the second mounting structure 14B.

Referring now to FIGS. 1-7, the rock rail assembly 12 includes a rail assembly 60 that is pivotably coupled to the mounting assembly 42 of the rock rail assembly 12. The rail assembly 60 includes the rail 38 and a linkage 62 that operably couples the rail 38 with the mounting assembly 42 of the rock rail assembly 12. In some embodiments, the rail assembly 60 can include a plurality of linkages 62 that operably couple the rail 38 and one or more mounting assemblies 42 of the rock rail assembly 12. For example, in the embodiment illustrated in FIGS. 3-7, the rail assembly 60 includes a first linkage 62A and a second linkage 62B. The first linkage 62A operably couples the rail 38 and the first mounting assembly 42A, and the second linkage 62B operably couples the rail 38 with the second mounting assembly 42B of the rock rail assembly 12. In various embodiments, the linkage 62 is pivotably coupled to the mounting assembly 42 and is operable to pivot relative to the mounting assembly 42 to move the rail 38 between the stowed and deployed positions. As illustrated in FIGS. 4 and 5, the rail 38 is coupled to and extends between the first and second linkages 62A, 62B.

Referring now to FIGS. 4-8, the linkage 62 of the rail assembly 60 can include a plurality of components. In the embodiment illustrated in FIGS. 4-8, the linkage 62 includes the pivot bar 36 that is pivotably coupled with the mounting assembly 42. In the embodiment illustrated in FIG. 8, the pivot bar 36 of the linkage 62 extends from a first end 64 to a second end 66. A first extent 68 of the pivot bar 36 extends from the first end 64 toward the second end 66, a second extent 70 extends from the second end 66 toward the first end 64, and an intermediate extent 72 is positioned between the first and second extents 68, 70 of the pivot bar 36. As illustrated in FIG. 8, the first and second extents 68, 70 are parallel to each other and align such that they are generally collinear. The intermediate extent 72 extends generally parallel to the first and second extents 68, 70 but is offset from the first and second extents 68, 70, such that the intermediate extent 72 is not generally collinear with the first and second extents 68, 70 of the pivot bar 36. As illustrated in FIG. 8, the intermediate extent 72 of the pivot bar 36 is pivotably engaged with the mounting structure 14 of the mounting assembly 42, and the first and second ends 64, 66 are positioned vehicle-forward and vehicle-rearward of the mounting structure 14, respectively.

The linkage 62 of the rail assembly 60 further includes a rail bracket 74 that couples the pivot bar 36 with the rail 38 of the rail assembly 60. As illustrated in FIGS. 4-8, in various embodiments, the linkage 62 can include a plurality of rail brackets 74. For example, in the illustrated embodiment, the linkage 62 includes two rail brackets 74 that are coupled to the first and second extents 68, 70 of the pivot bar 36, respectively. In various embodiments, the one or more rail brackets 74 are configured to fixedly couple the rail 38 and the pivot bar 36. As such, the rail 38 may pivot from the stowed position to the deployed position about a single pivot axis of the pivot bar 36. In various embodiments, the pivot axis extends through and/or parallel to the intermediate extent 72 of the pivot bar 36.

Referring now to FIGS. 3-7, the linkage 62 can further include a sector gear 40. The sector gear 40 may be coupled to the pivot bar 36 and configured to engage with the worm gear portion 34 of the shaft 26 of the motor 24, as described further herein. As illustrated in FIG. 8, the sector gear 40 can be mounted to the intermediate extent 72 of the pivot bar 36, in various embodiments.

Referring now to FIGS. 3-7, the rail assembly 60 of the rock rail assembly 12 includes the rail 38. In the embodiment illustrated in FIGS. 3-7, the rail 38 is coupled to the first mounting assembly 42A and the second mounting assembly 42B via the first and second linkages 62A, 62B. As illustrated in FIGS. 6 and 7, the rail 38 includes a rail body 76 and a metal tubular member 78 that is mounted to the rail body 76. As illustrated in FIG. 5, the rail brackets 74 of the first and second linkages 62A, 62B are mounted to the rail body 76 via fasteners, and the metal tubular member 78 is mounted to the rail body 76 and extends vehicle-laterally-outboard from the rail body 76. It is contemplated that the rail body 76 may be formed of metal in addition to the metal tubular member 78 being formed of metal. A variety of types of rails 38 and rail-materials are contemplated. Further, it is contemplated that the rail 38 can include exterior trim paneling that can partially or wholly cover the rail body 76 and/or the metal tubular member 78 of the rail 38.

Referring now to FIGS. 4-7, the rock rail assembly 12 includes the motor 24. The motor 24 is mounted to the motor bracket 22 and includes the shaft 26. In the embodiment illustrated in FIGS. 4 and 5, the shaft 26 extends up through an aperture 80 defined by the motor bracket 22 that the motor 24 is mounted to. The shaft 26 includes a first end 28 that is engaged with a rotor 30 of the motor 24, as illustrated in FIGS. 6 and 7, and a second end 32 that is distal from the first end 28. The second end 32 is rotatably received within the receiving hollow 20 defined by the arm 18 of the mounting assembly 42. In the embodiment illustrated in FIGS. 6 and 7, the second end 32 of the shaft 26 is received within a bushing 82 that is received within the receiving hollow 20 defined by the arm 18. The shaft 26 further includes the worm gear portion 34. The worm gear portion 34 is disposed between the first and second ends 28, 32 of the shaft 26. Operation of the motor 24 drives rotation of the shaft 26, in various embodiments.

Referring still to FIGS. 4-7, the sector gear 40 of the rail assembly 60 is configured to be operably engaged with the worm gear portion 34 of the shaft 26, such that rotation of the shaft 26 by the motor 24 drives pivotal movement of the pivot bar 36 relative to the mounting structure 14 of the mounting assembly 42. Pivotal movement of the pivot bar 36 relative to the mounting structure 14 causes movement of the rail 38 coupled thereto between the stowed position, as illustrated in FIGS. 4 and 6, and the deployed position, as illustrated in FIGS. 5 and 7.

Referring still to FIGS. 4-7, in some embodiments, in the stowed position of the rail 38, the sector gear 40 of the rail assembly 60 abuts a portion of the mounting assembly 42. In some embodiments, the sector gear 40 abuts the motor bracket 22 in the stowed position of the rail 38, as illustrated in FIGS. 4 and 6. In some embodiments, in the deployed position of the rail 38, the sector gear 40 abuts a portion of the mounting assembly 42. For example, in the deployed position of the rail 38 illustrated in FIGS. 5 and 7, the sector gear 40 abuts the arm 18 of the mounting assembly 42. In some implementations, the sector gear 40 can abut a first portion of the mounting assembly 42 in the stowed position of the rail 38, and the sector gear 40 can abut a second portion of the mounting assembly 42 in the deployed position of the rail 38. For example, in the embodiment illustrated in FIGS. 4-7, in the stowed position of the rail 38, the sector gear 40 abuts the motor bracket 22, and in the deployed position of the rail 38, the sector gear 40 abuts the arm 18. As illustrated in FIG. 7, in some embodiments, the sector gear 40 is configured to abut the proximal portion 56 of the arm 18 in the deployed position of the rail 38.

As illustrated in FIGS. 6 and 7, the sector gear 40 includes a generally arched engagement side 84 that includes a plurality of gear teeth that engage with the worm gear portion 34 of the shaft 26. The sector gear 40 further includes first and second contact sides 86, 88 that extend generally toward the pivot bar 36 from the arched engagement side 84 of the sector gear 40. As illustrated in FIGS. 6 and 7, the first and second contact sides 86, 88 of the sector gear 40 respectively abut the motor bracket 22 and the arm 18 of the mounting assembly 42 in the stowed and deployed positions of the rail 38, respectively. In the embodiments illustrated in FIGS. 6 and 7, the first and second contact sides 86, 88 are adjacent to the arched engagement side 84 of the sector gear 40.

In various embodiments, abutment of the sector gear 40 with the first portion of the mounting assembly 42 in the stowed position of the rail 38 generally prevents travel of the rail 38 beyond the stowed position in a first pivotal direction. Further abutment of the sector gear 40 with the second portion of the mounting assembly 42 in the deployed position of the rail 38 generally prevents travel of the rail 38 beyond the deployed position in a second pivotal direction that is opposite the first pivotal direction. In the embodiment illustrated in FIGS. 6 and 7, abutment of the sector gear 40 with the motor bracket 22 generally prevents travel of the rail 38 beyond the stowed position in the first pivotal direction, and abutment of the sector gear 40 with the arm 18 generally prevents travel of the rail 38 beyond the deployed position in the second pivotal direction that is opposite the first pivotal direction. It is contemplated that the motor 24 may be a variety of types of motors. In the illustrated embodiment, the motor 24 is an electric motor.

In operation of an exemplary embodiment of the rock rail assembly 12, a user approaching the vehicle 10 unlocks the doors of the vehicle 10 via a key fob. In response to the doors of the vehicle 10 being unlocked, the motor 24 of the rock rail assembly 12 is actuated such that the shaft 26 rotates. Rotation of the shaft 26 of the motor 24 causes the pivot bar 36 to pivot from the stowed position, as illustrated in FIGS. 4 and 6, to the deployed position, wherein the rail 38 of the rock rail assembly 12 is lowered, such that the user may conveniently step on the rail 38 to enter the vehicle 10. After the user enters the vehicle 10 and closes the door, the motor 24 drives counter-rotation of the shaft 26, which moves the rail 38 from the deployed position to the stowed position. In the stowed position, the shock absorption pads 46 abut the rail 38. As such, as the driver encounters an obstacle that contacts the rail 38, the shock absorption pads 46 cushion the rail 38, which may mitigate damage to the rock rail assembly 12 and/or the vehicle 10.

The rock rail assembly 12 of the present disclosure may provide a variety of advantages. First, the rock rail assembly 12 may provide protection to the vehicle 10 from obstacles, such as rocks, when the rail 38 is in the stowed position, and the rail 38 may provide a running board-like step for a user while in the deployed position. Second, the sector gear 40 abutting portions of the mounting assembly 42 in the deployed and stowed positions of the rail 38 may provide a mechanical stops for the rail assembly 60 that prevent over-travel of the rail 38 beyond the stowed and deployed positions. Third, the mounting assembly 42 having a shock absorption pad 46 that abuts the rail 38 in the stowed position of the rail 38 may aid in preventing or mitigating damage to the rail 38 that may be caused by an obstacle contacting the rail 38 during operation of the vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A rock rail assembly for a vehicle, comprising:
    a mounting assembly coupled to the vehicle and comprising a shock absorption pad, wherein the shock absorption pad is the vehicle-laterally-outboardmost portion of the mounting assembly; and
    a rail assembly pivotably coupled to the mounting assembly and having a rail, the rail assembly being operable to pivot relative to the mounting assembly to move the rail between a stowed position and a deployed position, wherein, in the stowed position of the rail, a portion of the rail abuts the shock absorption pad.

2. The rock rail assembly of claim 1, wherein the mounting assembly further comprises:
    a mounting structure that is mounted to an underside of the vehicle, wherein the mounting structure includes an attachment surface, the shock absorption pad abuts the attachment surface, and a vehicle-lateral direction is substantially normal to the attachment surface.

3. The rock rail assembly of claim 2, wherein the mounting structure is a metal mounting structure, and the shock absorption pad is a non-metal shock absorption pad.

4. The rock rail assembly of claim 2, wherein the shock absorption pad includes a contact surface that abuts the rail in the stowed position, and wherein a vehicle-lateral direction is substantially normal to the contact surface.

5. The rock rail assembly of claim 1, wherein the position of the rail in the deployed position is vehicle-downward of the position of the rail in the stowed position.

6. The rock rail assembly of claim 1, wherein the rail assembly further comprises:
    a pivot bar that is pivotably coupled with the mounting assembly; and
    a rail bracket that fixedly couples the rail and the pivot bar.

7. A rock rail assembly for a vehicle, comprising:
    a first mounting assembly coupled to the vehicle and having a first shock absorption pad;
    a second mounting assembly coupled to the vehicle in a spaced relationship with the first mounting assembly and having a second shock absorption pad;
    a third mounting assembly coupled to the vehicle in a spaced relationship with and positioned between the first and second mounting assemblies, wherein the third mounting assembly includes a third shock absorption pad;
    a first linkage operably coupled to the first mounting assembly;
    a second linkage operably coupled to the second mounting assembly; and
    a rail coupled to and extending between the first and second linkages, wherein the first and second linkages are operable to move relative to the first and second mounting assemblies, respectively, such that the rail is operable between a stowed position, wherein the rail abuts the first, second, and third shock absorption pads, and a deployed position, wherein the rail is in a spaced relationship with each of the first, second, and third shock absorption pads.

8. The rock rail assembly of claim 7, wherein the first linkage further comprises:
- a pivot bar pivotably coupled with the first mounting assembly; and
- a rail bracket that fixedly couples the rail and the pivot bar.

9. The rock rail assembly of claim 7, wherein the first mounting assembly includes a first mounting structure that the first shock absorption pad is coupled to, the second mounting assembly includes a second mounting structure that the second shock absorption pad is coupled to, and the third mounting assembly includes a third mounting structure that the third shock absorption pad is coupled to, wherein each of the first, second, and third mounting structures are mounted to an underside of the vehicle, and the third mounting structure is smaller than the first mounting structure and the second mounting structure.

10. The rock rail assembly of claim 7, wherein the first mounting assembly further comprises:
- a first mounting structure that is mounted to an underside of the vehicle, wherein the first mounting structure includes an attachment surface, the first shock absorption pad abuts the attachment surface, and a vehicle-lateral direction is substantially normal to the attachment surface.

11. The rock rail assembly of claim 10, wherein the first mounting structure is a metal mounting structure, and the first shock absorption pad is a non-metal shock absorption pad.

12. The rock rail assembly of claim 7, wherein the first shock absorption pad includes a contact surface that abuts the rail in the stowed position, and wherein a vehicle-lateral direction is substantially normal to the contact surface.

13. The rock rail assembly of claim 7, wherein the first shock absorption pad is the vehicle-laterally-outboardmost portion of the first mounting assembly.

14. The rock rail assembly of claim 7, wherein the position of the rail in the deployed position is vehicle-downward of the position of the rail in the stowed position.

15. A rock rail assembly for a vehicle, comprising:
- a rail coupled to the vehicle and operable to move relative to the vehicle between a stowed position and a deployed position; and
- a first shock absorption pad having a contact surface that abuts the rail in the stowed position, wherein a vehicle-lateral direction is substantially normal to the contact surface.

16. The rock rail assembly of claim 15, further comprising:
- a second shock absorption pad in a spaced relationship with the first shock absorption pad, wherein the second shock absorption pad has a contact surface that abuts the rail in the stowed position of the rail.

17. The rock rail assembly of claim 16, further comprising:
- a third shock absorption pad in a spaced relationship with the first and second shock absorption pads, wherein the third shock absorption pad has a contact surface that abuts the rail in the stowed position of the rail.

18. The rock rail assembly of claim 15, wherein the position of the rail in the deployed position is vehicle-downward of the position of the rail in the stowed position.

19. The rock rail assembly of claim 15, further comprising:
- a linkage coupled to the rail and pivotably coupled to a mounting assembly mounted to the vehicle, wherein the rail moves between the stowed and deployed positions via pivotal movement of the linkage relative to the mounting assembly.

20. The rock rail assembly of claim 19, wherein the mounting assembly includes the first shock absorption pad, and the first shock absorption pad is the vehicle-laterally-outboardmost portion of the mounting assembly.

* * * * *